United States Patent

[11] 3,582,796

| [72] | Inventors | Glynne W. Shifflet, Jr.;<br>Royal J. Dossett; Gary D. White, all of<br>Minneapolis, Minn. |
|---|---|---|
| [21] | Appl. No. | 758,482 |
| [22] | Filed | Sept. 9, 1968 |
| [45] | Patented | June 1, 1971 |
| [73] | Assignee | Electro/General Corporation<br>Minneapolis, Minn. |

[54] CONTROL SYSTEM
10 Claims, 2 Drawing Figs.

[52] U.S. Cl.................................................. 328/69,
328/3, 328/63, 307/215
[51] Int. Cl........................................................H03k 17/00
[50] Field of Search................................. 328/3, 69,
63; 307/310, 252, 269, 247, 215, 268

[56] References Cited
UNITED STATES PATENTS

| 3,497,664 | 2/1970 | Vanderhelst................. | 328/69X |
| 3,219,936 | 11/1965 | Eksten et al. ................. | 328/3 |
| 3,363,143 | 1/1968 | Cavanaugh................... | 307/252X |
| 3,356,784 | 12/1967 | Bertiali et al. ................ | 307/252X |
| 3,187,202 | 6/1965 | Case............................ | 307/268 |

*Primary Examiner*—Donald Forrer
*Assistant Examiner*—B. P. Davis
*Attorney*—Lew Schwartz

ABSTRACT: In a control system utilizing comparison of a feedback signal with a set point voltage to develop an error signal, means for developing a train of pulses proportional to the error signal, means for developing a train of pulses proportional to the integral of the sign of the error, and means for summing the two trains of pulses. The sum of pulses being used to control a time-averaged output control signal for reducing the error signal to zero.

INVENTORS
GLYNNE W. SHIFFLET, JR.
ROYAL J. DOSSETT,
BY GARY D. WHITE
Burd, MacEachron, Braddock,
Bartz & Schwartz
ATTORNEYS

CONTROL SYSTEM

BACKGROUND OF THE INVENTION

Numerous control systems are known in the art, which use the long recognized principles of potentiometric comparison of a feedback signal with a set point voltage. It is also known that the difference between the feedback signal and the set point voltage, which constitutes the error, may be amplified and integrated to prepare a control signal for correcting the error. However, most prior art systems develop the control signal in an analog manner, which systems carry with them the known disadvantages as well as advantages of analog circuitry. Some prior art control systems have attempted to use digital control, but none is known which, as the present invention, can provide direct digital control while at the same time increasing accuracy and reliability, and, in the case of some systems, decreasing costs.

SUMMARY OF THE INVENTION

Briefly described, the apparatus of this invention comprises a direct digital control system wherein an analog error signal is developed by conventional means and passed through an analog-to-digital converter, the output of which comprises a train of pulses, the number of pulses in the train being proportional to the error signal. The number of pulses in the train are then counted and used to determine the on-off ratio of an output control signal. The apparatus of this invention also provides for reset circuitry which comprises a means for providing a second train of pulses proportional to the integral of the sign of the error, and summing that with the first train of pulses to determine the on-off ratio of the time-averaged output signal. Where the error is less than a predetermined amount, a third train of pulses from a constant-pulse generator is summed with the other pulses to properly fill the entire period of the time-averaged signal.

DESCRIPTION OF THE PREFERRED EMBODIMENT

Figure 1:
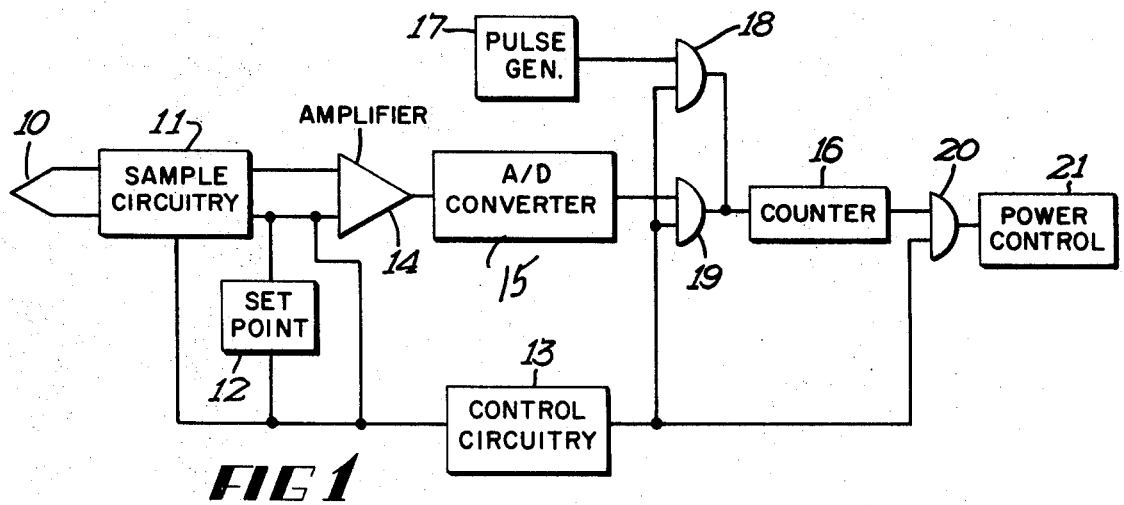
FIG. 1 comprises a block diagram of a system incorporating the apparatus of this invention.

Referring to FIG. 1 there is shown a block diagram of a preferred embodiment of the apparatus of this invention as used in a temperature control system, though it will be understood that the applications of the apparatus of this invention are not limited to temperature control systems.

In FIG. 1 there is shown a thermocouple 10 connected to a sample circuitry 11. Sample circuitry 11 is connected to a set point circuitry 12, both of which are controlled by a control system 13. When thermocouple 10 is sampled and compared with the set point voltage, the difference between the two is presented to a scaling amplifier 14, the output of which constitutes the error signal. The error signal is then presented to an analog-to-digital converter 15, which provides an output train of binary pulses, the number of which is proportional to the error signal. This train of pulses is gated through a gate 19, enabled by control circuitry 13, into a counter 16. If the train of pulses from converter 15 is sufficient to fill counter 16, the output will pass through a gate 20, also enabled by control circuitry 13, to a power control module 21, which will provide additional heat to correct the error at thermocouple 10. If the train of pulses from converter 15 is not sufficient to fill counter 16, a pulse generator 17 will provide a constant train of pulses to gate 18, which is also enabled by control circuitry 13. The pulses from pulse generator 17 are preferably of a much lower frequency than the pulses from converter 15. It can thus be seen that control circuitry 13 enables gate 20 for a predetermined period of time, and the time it takes to fill counter 16 will determine the on/off portion of the output signal from gate 20, which time-averaged signal controls power control module 21 and thus controls the correction signal to thermocouple 10.

Figure 2:
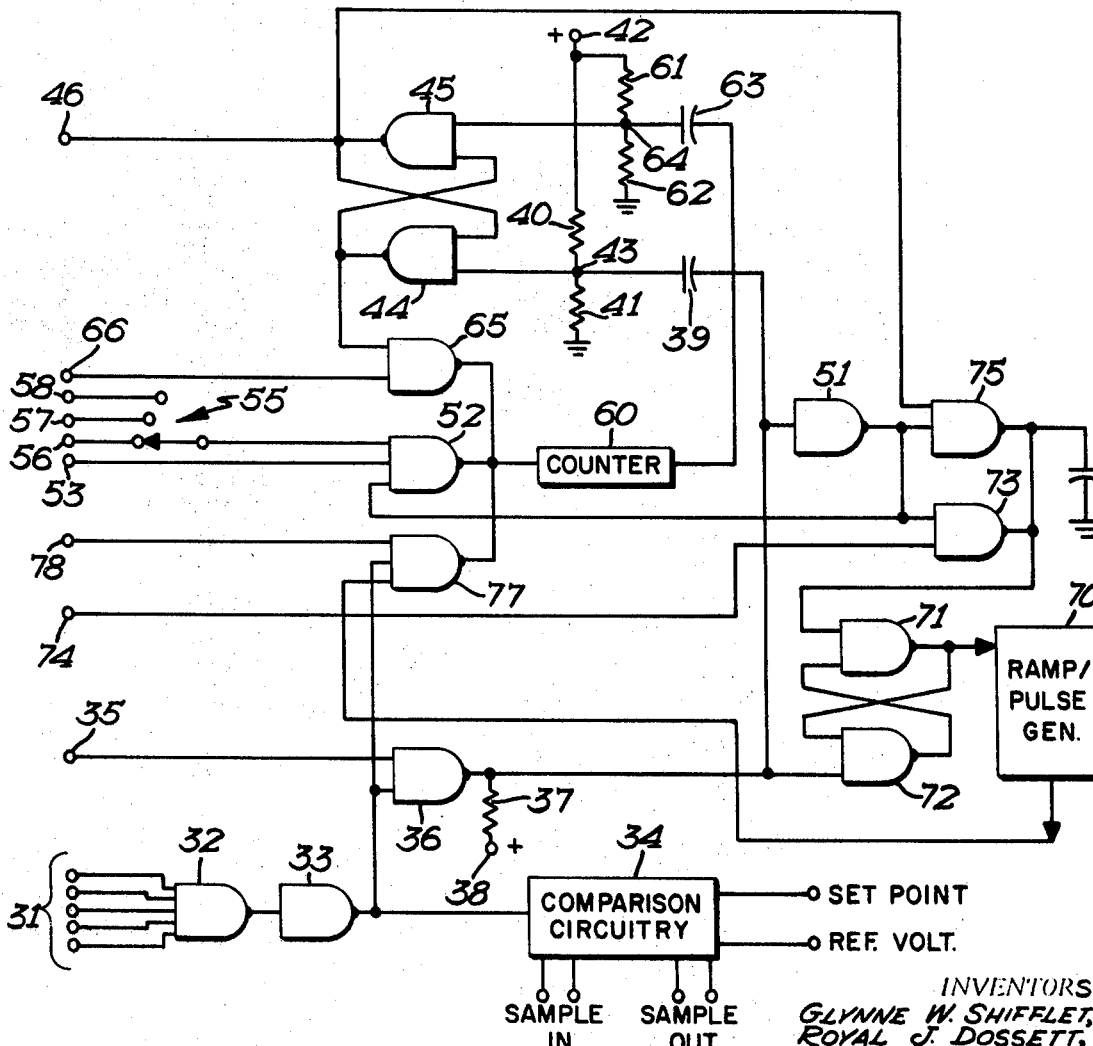
FIG. 2 comprises a block diagram of the apparatus of this invention as applied in modular form.

Referring now to FIG. 2, it should first be recognized that the system of FIG. 1, for example, can be broken down into modular forms, and a single control circuit such as 13, along with analog-to-digital converter 15, amplifier 14 and pulse generator 17, can be used to check a multitude of points, exemplified here as thermocouple 10, and also a plurality of sampling and time-averaged signal-producing modules including counter 16. Therefore, FIG. 2 shows a schematic, partially in block diagram, of a module adapted to work under control of control circuitry 13, amplifier 14, converter 15 and pulse generator 17.

A plurality of input terminals 31 may be used to receive coded signals representing the selection of the module of FIG. 2. When terminals 31 are all selected, the output of a gate 32 will go to zero, and as a result the output of a gate 33 will go to one. The output of gate 33 is connected to a block 34 representing comparison circuitry. When enabled by the output of gate 33, comparison circuitry 34 will take a sample of the process under control, such as a sample of thermocouple 10 in FIG. 1, and provide an output of the sample voltage and a set-point voltage as compared with the reference voltage to be acted on by an amplifier such as amplifier 14 in FIG. 1, and an analog-to-digital converter such as 15 in FIG. 1. Converter 15 will then provide a train of pulses proportional to the difference between the sampled voltage and the set-point voltage, synonymous with the error voltage.

The code signals arriving at terminals 31 will be under control of control circuitry such as 13 in FIG. 1, and thus all time signals will come from a central control circuitry source, such as 13 in FIG. 1.

A predetermined time after the enabling of circuitry 34, an enter pulse will appear at an input terminal 35 to be felt at one of two inputs to a gate 36. The other input of gate 36 is connected to the output of gate 33 and therefore, when the enter signal is received, the output of gate 36 will go to zero. With regard to the timing of the enter signal at terminal 35, it should be mentioned that many analog-to-digital converters such as 15, which provide a train of pulses proportional to the analog input signal, add to the train of pulses a constant number of pulses. In one analog-to-digital converter available on the market and used in the reduction of this invention to practice, 1000 pulses are added to the train of pulses proportional to the error signal. The timing of the enter pulse at terminal 35 can be such as to mask out the unneeded 1000 extra pulses from converter 15, if desired.

The output of gate 36 passes through an RC network comprising a resistor 37 connected to a positive voltage terminal 38, a capacitor 39, and a portion of a voltage divider comprising a pair of resistors 40 and 41 serially connected between ground and a positive voltage terminal 42. Capacitor 39 is connected serially between the output of gate 36 and a junction 43 between resistors 40 and 41, junction 43 being directly connected to one input of a gate 44. Therefore, as the output of gate 36 becomes zero, the changing signal will be differentiated and felt at the input to gate 44, causing its output to go to one. Gate 44 is connected with another gate 45 to form a bistable unit, and thus as the output of gate 44 goes to one, the output of gate 45 will go to and remain in the zero state. The output of gate 45 is the desired control signal which is to be time-averaged by the circuitry of FIG. 2. Therefore an output terminal 46 is connected to the element it is desired to control, as for example, in the system of FIG. 1, terminal 46 would connect to a power module such as a power control 21 to turn off the heater when the output at terminal 46 is in the zero state.

Also during the time the enter pulse is present at terminal 35, the zero output of gate 36 will be felt at the input to a gate 51, the output of which is connected to one of the inputs of another gate 52. Gate 52 has a second input connected to a terminal 53 which is adapted to receive a signal indicating that the sign of the error is positive, that is, the feedback signal is less than the set-point signal, in which case a train of pulses will appear from the A-D converter such as converter 15. Gate 52 has yet another input connected to a proportional band switch 55, which will be more fully described below. As shown in FIG. 2, switch 55 is connected such that terminal 56 is connected to the third input of Gate 52. Terminal 56 is adapted to receive the train of pulses proportional to the error signal. Thus, these pulses will pass through gate 52 in the presence of the enter signal at terminal 35, to be summed in a counter 60. Should the train of pulses at terminal 56 be sufficient to fill counter 60, the output of the counter will become zero and this change will be felt through an RC network comprising a pair of resistors 61 and 62 connected between terminal 42 and ground and a capacitor 63 connected between the output of counter 60 and a junction 64 between resistors 61 and 62. Junction 64 is directly connected to the input of gate 45, and therefore as the output of counter 60 goes to zero, the output of gate 45 will go to one and remain there until the next enter pulse at terminal 35.

If there are no pulses at terminal 56, that is, the sign of the error is negative indicating an overshot condition, counter 60 will not advance during the presence of the enter signal at gate 35 and the output of gate 45 will remain at zero until the end of the cycle.

Counter 60 will be selected to have a predetermined number of counts selected for the particular application of the apparatus of this invention. In the preferred embodiment of the drawings, counter 60 was selected to be a 16-bit counter, that is, it counts from zero to 15 in binary. Converter 15 is selected to have high frequency output capable of providing 16 pulses during an enter signal in the ms. range. Pulse generator 17 of FIG. 1 is adapted to provide 15 pulses per second. Thus it can be seen that where the count at terminal 56 is greater than zero but less than 16, counter 60 will advance that number of counts during the presence of the enter pulse at terminal 35. Subsequently, a gate 65 which has been partially enabled as the output of gate 44 went to one, will become fully enabled through a terminal 66 adapted to receive the 15 pulses per second from pulse generator 17. Therefore the 15 pulse-per-second information will advance counter 60 until the counter is full. As described above, when counter 60 becomes full, its output will cause the output at terminal 46 to become one, and remain so until the next enter pulse at terminal 35. It can thus be seen that the output at terminal 46, directly connected to the output of gate 45, is a time-averaged signal whose total period in this preferred embodiment is 16/15 seconds and whose on-off ratio is proportional to the total pulse count between zero and 16.

FIG. 2 also shows incorporation of a reset system which can be used with the apparatus of this invention described above. The reset system is designed to provide an additional train of pulses to counter 60, proportional to the integral of the sign of the error signal. Thus, when the sign has been continually positive, the reset circuitry will provide a greater number of pulses to add to the counter to increase the on portion of the output signal at terminal 46. Conversely, when the sign has been negative, the number of pulses from the reset circuitry will decrease to zero.

The heart of the reset system is a pulse generator here indicated as 70 which operates on a ramp principle such that the longer the ramp input has been on, the greater the number of output pulses. The input to generator 70 is the output of a gate 71 connected in pair with a gate 72 such that gate 71 and 72 form a bistable unit. When the output of gate 71 is zero, the ramp of generator 70 is traveling up, and when the output of gate 71 is one, the ramp is traveling down. While not shown, the ramp-type pulse generator circuitry comprising block 70 is well known to those skilled in the art.

It will be noted that when an enter pulse appears at terminal 35 and the output of gate 36 goes to zero, the output of gate 72 will go to one thus locking the output of gate 71 at zero. Therefore, each time an enter pulse appears at terminal 35 pulse generator 70 tends to have an up ramp which will increase its pulse output. However, another gate 73 has one input connected to the output of 51, which in the presence of the enter signal at terminal 35 is a one as described above. Another input of gate 73 is connected to a terminal 74 adapted to receive a signal indicating a negative sign. If the negative-sign signal is also a one, the output of gate 73 will go to zero thus forcing the output of gate 71 to a one and causing the ramp and resulting pulse output generator 70 to go down. Therefore, it can be seen that if the sign of the error signal is not positive the number of pulses from generator 70 will decrease, and conversely if the sign is positive the number of pulses shown at gate 70 will increase, thus making the pulse output proportional to the integral of the sign of the error.

One other case exists involving the reset circuitry, that being the inhibiting of the increase of generator 70 when maximum correction is already being made. A gate 75 is provided for this purpose. The output of gate 75 is connected to the input of gate 71. One input of gate 75 is connected to the output of gate 51, which as described above is a one during the time of an enter pulse at terminal 35. Another input of gate 75 is connected to the output of gate 45, which as described above is a zero until counter 60 has filled. Therefore, if counter 60 fills during the enter pulse, the output of gate 45 will go to one causing the output of gate 75 to go to zero, thus forcing the output of gate 71 to one and inhibiting pulse generator 70.

The addition of the pulses from generator 70 to the pulses proportional to the error signal which arrive at terminal 56 is provided by a gate 77 which has one input connected to the output of generator 70, another input connected to the output of gate 33, and yet another input connected to a terminal 78 adapted to receive a short post-enter pulse immediately following the enter pulse at terminal 35. Therefore, when the reset circuitry is used, counter 60 will first receive the train of pulses at terminal 56 which are proportional to the error signal. Counter 60 will next receive the train of pulses from generator 70 which are proportional to the integral of the sign of the error signal. And finally, assuming the first two trains of pulses are not sufficient to fill counter 60, counter 60 will receive pulses from the 15 pulse-per-second source connected to terminal 66, until it has filled.

As described above, because the on-off time of the output signal at terminal 46 is determined by the length of time it takes to fill counter 60, the sum of the pulses mentioned in the last-above paragraph will determine the average on time for the correction signal to the process under control.

A point of interest is the proportional band switch 55 briefly described above. Switch 55 is capable of selecting input terminal 56, another input terminal 57, or yet another input terminal 58, as an input to gate 52. In the preferred embodiment the train of pulses proportional to the error signal is at terminal 56. A pulse train of one-half of this number is adapted to appear at terminal 57, while a train of one-fourth the original number is adapted to appear at terminal 58. Assuming the 16-bit counter of the preferred embodiment described above, if the proportional band switch is set to terminal 56 and if each pulse represents 1° F. of error, it can be seen that the proportional band will be in fact equal to 16° F., that is, an error of 16° F., will completely fill counter 60 and give full output. By setting proportional band switch 55 to connect to terminal 57, it will require 32° F., of error to get 16 pulses into counter 60, therefore the proportional band would be 32° F. Similarly, setting the proportional band switch to connector terminal 58 will yield a proportional band of 64° F.

It will be understood that what has been described above is a preferred embodiment of the apparatus of this invention, but that the invention is by no means limited to that which is specifically described. Other means may be used to accomplish similar results without departing from the spirit of this invention.

The embodiments of the invention in which we claim an exclusive property or privilege are defined as follows:

1. In a control system including means for determining an electrical error system and means for converting said error signal to a first train of pulses proportional to the error signal, the improved apparatus for providing a control signal to the process being controlled, comprising:
   first means for providing an output control signal capable of on and off states;
   second means adapted to sum said first train of pulses;
   means connected to said first and second means for controlling the on-off ratio of said output control signal, dependent on the sum of said first train of pulses;
   third means for providing a second train of pulses proportional to the integral of the sign of the error signal; and
   means connecting said third means to said second means for summing said first and second trains of pulses.

2. The apparatus of claim 1 including:
   selectable inhibit means connected between said second and third means for selectively inhibiting said second train of pulses from reaching said second means.

3. The apparatus of claim 1 in which said third means includes:
   controllable ramp generator means;
   oscillator means connected to said ramp generator means and adapted to oscillate at varying frequencies dependent on the height of a ramp from said ramp generator; and
   means connected to said ramp generator means for control thereof.

4. The apparatus of claim 1 in which said second means includes a pulse counter.

5. The apparatus of claim 4 including:
   pulse generator means for providing a third train of pulses; and
   said pulse generator means connected to said counter for filling said counter when the sum of said first and second trains of pulses is less than the capacity of said counter.

6. The apparatus of claim 5 including:
   selectable inhibit means connected between said second and third means for selectively inhibiting said second train of pulses from reaching said second means.

7. In a control system including means for providing an error signal from the process being controlled, the improved apparatus for providing a control signal comprising:
   means for converting the error signal to a proportional train of digital pulses;
   means for generating further pulses;
   means for summing said train of pulses and said further pulses;
   means for periodically providing a control output capable of on and off states;
   means connecting connecting said means for summing to said means for providing a control output signal, for controlling the on-off ratio of said control output signal;
   means for providing another train of pulses proportional to the integral of the sign of the error signal; and
   said last named means connected to said means for summing.

8. Control apparatus for providing a control signal from an error signal comprising:
   converter means for converting the error signal to a proportional number of binary pulses of a first frequency;
   generator means for providing continuous binary pulses of a second frequency;
   a binary pulse counter having a predetermined count capacity;
   controlled gate means for sequentially gating said converter means binary pulses and said generator means binary pulses into said counter, said gate means operative to block said generator means binary pulses when said counter is filled to capacity;
   controllable output means for providing a periodic output signal capable of on and off states; and
   means connecting said counter to said output means for controlling the on-off ratio of said periodic output signal.

9. The apparatus of claim 8 in which:
   said periodic output signal is normally in the off state and switched to the on state when said counter is filled to capacity.

10. The apparatus of claim 9 including:
    means for integrating the sign of said error signal and providing a train of binary pulses having a frequency proportional to said integral; and
    means connecting said means for integrating to said controlled gate means for summing said converter means binary pulses and said train of binary pulses in said counter prior to said generator means binary pulses.